United States Patent
Da Silva et al.

(10) Patent No.: US 11,917,707 B2
(45) Date of Patent: Feb. 27, 2024

(54) HANDLING OF REESTABLISHMENT FAILURE AMBIGUITY

(71) Applicant: Telefonaktiebolaget LM Ericsson (publ), Stockholm (SE)

(72) Inventors: Icaro Leonardo J. Da Silva, Solna (SE); Magnus Stattin, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 204 days.

(21) Appl. No.: 17/290,880

(22) PCT Filed: Aug. 29, 2019

(86) PCT No.: PCT/EP2019/073087
§ 371 (c)(1),
(2) Date: May 3, 2021

(87) PCT Pub. No.: WO2020/088819
PCT Pub. Date: May 7, 2020

(65) Prior Publication Data
US 2021/0400756 A1 Dec. 23, 2021

Related U.S. Application Data

(60) Provisional application No. 62/754,294, filed on Nov. 1, 2018.

(51) Int. Cl.
*H04W 76/19* (2018.01)
*H04W 12/106* (2021.01)
*H04W 12/122* (2021.01)

(52) U.S. Cl.
CPC ......... *H04W 76/19* (2018.02); *H04W 12/106* (2021.01); *H04W 12/122* (2021.01)

(58) Field of Classification Search
CPC .. H04W 12/106; H04W 12/122; H04W 76/19
See application file for complete search history.

(56) References Cited

U.S. PATENT DOCUMENTS 8,244,205 B2    8/2012   Wu
2008/0101609 A1*  5/2008   Jiang .................... H04L 63/123
                                                    726/22

(Continued)

FOREIGN PATENT DOCUMENTS

CN    105517022 A    4/2016
CN    106937317 A    7/2017

(Continued)

OTHER PUBLICATIONS

Author Unknown, "Technical Specification Group Services and System Aspects; 3GPP System Architecture Evolution (SAE); Security architecture (Release 15)," Technical Specification 33.401, Version 15.5.0, 3GPP Organizational Partners, Sep. 2018, 163 pages.

(Continued)

*Primary Examiner* — Liton Miah
(74) *Attorney, Agent, or Firm* — Withrow & Terranova, PLLC

(57) ABSTRACT

Embodiments described herein relate to methods and apparatuses for performing a re-establishment procedure. A method in a user equipment comprises: receiving a re-establishment message; upon reception of the re-establishment message, monitoring for an indication of an integrity check failure received from lower layers, wherein the indication relates to a first message or a second message received by the UE after transmitting a re-establishment request; responsive to the indication of the integrity check failure, performing actions upon going into an RRC_IDLE mode of operation; indicating a connection failure to upper (Continued)

layers; and based on the indication, upper layers triggering a recovery procedure.

18 Claims, 13 Drawing Sheets

(56) References Cited

U.S. PATENT DOCUMENTS

| | | | |
|---|---|---|---|
| 2014/0038616 A1 | 2/2014 | Burbidge et al. | |
| 2014/0098657 A1 | 4/2014 | Kubota et al. | |
| 2016/0192269 A1* | 6/2016 | Kim | H04W 36/0072 370/332 |
| 2016/0353511 A1* | 12/2016 | Gunnarsson | H04W 76/19 |
| 2018/0092156 A1* | 3/2018 | Kim | H04W 72/1273 |
| 2019/0037635 A1* | 1/2019 | Guo | H04W 76/27 |
| 2021/0243832 A1* | 8/2021 | Teyeb | H04W 76/18 |

FOREIGN PATENT DOCUMENTS

| | | |
|---|---|---|
| RU | 2578666 C2 | 3/2016 |
| WO | 2013106060 A2 | 7/2013 |

OTHER PUBLICATIONS

Author Unknown, "Technical Specification Group Services and System Aspects; Security archcitecture and procedures for 5G system (Release 15)," Technical Specification 33.501, Version 15.2.0, 3GPP Organizational Partners, Sep. 2018, 175 pages.
Author Unknown, "Technical Specification Group Radio Access Network; Evolved Universal Terrestrial Radio Access (E-UTRA); User Equipment (UE) procedures in idle mode (Release 15)," Technical Specification 36.304, Version 15.1.0, 3GPP Organizational Partners, Sep. 2018, 55 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.3.0, 3GPP Organizational Partners, Sep. 2018, 918 pages.
Author Unknown, "Technical Specification Group Radio Access Network; NR; User Equipment (UE) procedures in Idle mode and RRC Inactive state (Release 15)," Technical Specification 38.304, Version 15.1.0, 3GPP Organizational Partners, Sep. 2018, 27 pages.
Author Unknown, "Technical Specification Group Radio Access Network; NR; Radio Resource Control (RRC) protocol specification (Release 15)," Technical Specification 38.331, Version 15.3.0, 3GPP Organizational Partners, Sep. 2018, 445 pages.
Ericsson, "R2-1817597: CR to 38.331 on Integrity Check failure at RRC Reestablishment," Third Generation Partnership Project (3GPP), TSG-RAN WG2#104, Nov. 12-16, 2018, 4 pages, Spokane, Washington.
Huawei, et al., "R2-1810313: Re-establishment upon integrity check failure," Third Generation Partnership Project (3GPP), TSG-RAN WG2#AH1807, Jul. 2-6, 2018, 3 pages, Montreal, Canada.
Intel Corporation, "S3-170352wasS3-170162: Security of RRC Connection re-establishment of NB-IOT for CP Solution," Third Generation Partnership Project (3GPP), TSG SA WG3 (Security) Meeting #86, Feb. 6-10, 2017, 6 pages, Sophia-Antipolis, France.
International Search Report and Written Opinion for International Patent Application No. PCT/EP2019/073087, dated Dec. 2, 2019, 13 pages.
International Preliminary Report on Patentability for International Patent Application No. PCT/EP2019/073087, dated Jan. 21, 2021, 13 pages.
Intel, "C1-165062: Lossless data transmission during connected mode mobility for NB-IOT UE using CP CIoT EPS optimisation," 3GPP TSG CT WG1 Meeting #101, Nov. 14-18, 2016, Reno, Nevada, 3 pages.
RAN WG1, "RP-160932: Status Report to TSG," 3GPP TSG RAN meeting #72, Jun. 13-16, 2016, Busan, Korea, 59 pages.
Notice of Reasons for Refusal for Japanese Patent Application No. 2021-523688, dated Jun. 14, 2022, 6 pages.
First Office Action for Chinese Patent Application No. 201980087417.7, dated Nov. 25, 2023, 14 pages.

* cited by examiner

HANDLING OF REESTABLISHMENT FAILURE AMBIGUITY

This application is a 35 U.S.C. § 371 national phase filing of International Application No. PCT/EP2019/073087, filed Aug. 29, 2019, which claims the benefit of U.S. Provisional Application No. 62/754,294, filed Nov. 1, 2018, the disclosures of which are incorporated herein by reference in their entireties.

TECHNICAL FIELD

Embodiments described herein relate to methods and apparatus for performing a re-establishment procedure.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reestablishment Procedure in LTE

In LTE, according to 3GPP TS 36.331, the reestablishment procedure is triggered in different failure detection situations, including when the UE is in RRC_CONNECTED and receives an indication from lower layers that signaling radio bearers SRB1 or SRB2 failed integrity verification. This is shown below in an excerpt from 36.331:

---

\*\*\*Start
Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
5.3.7.2    Initiation
The UE shall only initiate the procedure either when AS security has been activated or for a NB-IoT UE supporting RRC connection re-establishment for the Control Plane CIoT EPS optimisation. The UE initiates the procedure when one of the following conditions is met:
    1> upon detecting radio link failure, in accordance with 5.3.11; or
    1> upon handover failure, in accordance with 5.3.5.6; or
    1> upon mobility from E-UTRA failure, in accordance with 5.4.3.5; or
    1> upon integrity check failure indication from lower layers
       concerning SRB1 or SRB2; or
    1> upon an RRC connection reconfiguration failure, in accordance
       with 5.3.5.5; or
    1> upon an RRC connection reconfiguration failure, in accordance
       with TS38.331 [82, 5.3.5.5].
\*\*\*End
Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Definitions for the above excerpt:
AS = Access Stratum
NB-IoT = Narrow Band Internet of Things
RRC = Radio Resource Control
CIoT EPS = Consumer Internet of Things Evolved Packet System
E-UTRA = Evolved Universal Terrestrial Radio Access

---

The indication from lower layers that signaling radio bearers SRB1 or SRB2 failed integrity verification may be sent when the received message is an RRCConnectionReconfiguration message.

Another relevant aspect is that upon reestablishment initiation the UE sends an RRCConnectionReestablishmentRequest on SRB0 (i.e. not encrypted and not integrity protected), in the typical case it receives an RRCConnectionReestablishment on SRB0 in response (i.e. not encrypted and not integrity protected) and, after starting security, sends an RRCConnectionReestablishmentComplete message on SRB1. That is illustrated in the following signalling flow from 36.331 illustrated in FIG. 10.

Another relevant aspect to mention is that as the RRCConnectionReestablishment message is sent on SRB0, the UE relies on the first RRCConnectionReconfiguration message (that one on SRB1, i.e., integrity protected and encrypted) after the reestablishment procedure to resume the DRBs and SRBs (other than SRB0 and SRB1).

Reestablishment Procedure in NR

Some aspects may be enhanced to speed up the failure recovery, e.g., in case of handover failures. Some of these aspects are the following:

RRCReestablishment on SRB1: There may be no fundamental reason why the UE could not re-establish Packet Data Convergence Protocol (PDCP) for SRB1 and resume SRB1 in the Downlink (DL) before submitting MSG3 to lower layers. This would make it possible to use SRB1 for MSG4 instead of SRB0, which would in turn make it possible to send subsequent RRC reconfiguration messages in conjunction with MSG4 or directly after instead of waiting for the UE response in MSG5. This would save a round-trip in the re-establishment of Data Radio Bearers (DRBs).

RRCSetup in response to RRCReestablishmentRequest: It may be possible to support faster Non-Access Stratum (NAS) recovery in the Radio Access Network (RAN) if the RAN is not able to re-establish the UE context, e.g., a cell is not prepared during handover failure. This may be done by the network sending an RRC connection setup message on SRB0 (instead of a RRC re-establishment reject) which may be used to initiate normal RRC connection setup.

RRCReestablishmentReject was removed: This message may no longer be needed due to a fallback procedure. If the UE tries to re-establish in a cell that is not prepared or that the network cannot re-establish the DRBs the network can send an RRCSetup message. In the scenario where the cell is overloaded, the network may simply wait until a failure timer T301 expires, so that the user equipment (UE) enters RRC_IDLE and performs access control before trying again.

FIG. 11 describes the reestablishment procedure in NR where these aspects were adopted.

In step 1 the UE re-establishes the connection, providing the UE Identity (Physical Cell Identity (PCI)+ Cell Radio Network Temporary Identifier (C-RNTI)) to the base station (e.g. gNB) where the trigger for the re-establishment occurred.

In step 2 if the UE Context is not locally available, the gNB, requests the last serving gNB to provide UE Context data.

In step 3 the last serving gNB provides UE context data.
In steps 4/4a the gNB continues the reestablishment of the RRC connection. The message is sent on SRB1.

In steps 5/5a the gNB may perform the reconfiguration to re-establish SRB2 and DRBs when the reestablishment procedure is ongoing.

In step 6 if loss of DL user data buffered in the last serving gNB shall be prevented, the gNB provides forwarding addresses.

In steps 7/8 the gNB performs path switch.

In step 9 the gNB triggers the release of the UE resources at the last serving gNB.

Integrity Protection of Messages in LTE and NR

In Long Term Evolution (LTE) and NR, integrity protection of messages is performed in the Packet Data Convergence Protocol (PDCP) in both the network and the UE by computing a Message Authentication Code-Integrity (MAC-I) which is included in the PDCP header. The MAC-I is a secure checksum calculated using an integrity protection algorithm. When the receiver receives the PDCP packet it computes and verifies the MAC-I using the same inputs and algorithms as the transmitter so that each side can be authenticated. The MAC-I derivations are specified in TS 33.401 and TS 33.501 for EPS and 5G System (5GS) respectively, although the only difference is which algorithms are applied. For LTE connected to either EPC or SGC, the algorithms used are defined in TS 33.401, while for NR, the algorithms used are defined in 33.501. Unlike the MAC-I which is included at and verified by the PDCP layer, the security token is included and verified at the RRC layer. Below is an excerpt from the 5G security specification (see section D.3.1.1 in 3GPP TS 33.501) for the derivation of the MAC-I:

In the LTE case, as the message is sent on SRB0, the UE relies on the first RRCConnectionReconfiguration message sent on SRB1 after the reestablishment procedure is completed to resume SRBs and DRBs. However, after reestablishment procedure and upon the reception of a message, e.g., RRCConnectionReconfiguration after reestablishment, the lower layers may indicate an integrity protection failure. However, according to the LTE specifications the UE shall trigger reestablishment again. The problem is that this may lead to an infinite loop as upon the failure the UE may not perform cell selection/re-selection so that the UE may get stuck on the same cell where the failure has occurred. Notice that this may be particularly problematic if the integrity protection failure is caused by non-radio related problems, i.e., UE will likely not change cell when these multiple failures occur.

In the NR case, the RRCReestablishment message is sent on SRB1, i.e., integrity protected and encrypted. Thanks to that, network may multiplex an RRCReconfiguration message together with the RRCReestablishment message. And, as the RRCReestablishment is sent on SRB1, that may fail the integrity verification. There is currently an ambiguity in the specifications concerning the UE actions upon detecting an integrity verification failure.

According to sub-clause 5.3.7.2 in NR RRC (3GPP TS 38.331), the UE shall initiate a reestablishment procedure

---

\*\*\*Start
Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*
D.3.1.1    Inputs and outputs
The input parameters to the integrity algorithm are a 128-bit integrity key named
KEY, a 32-bit COUNT, a 5-bit bearer identity called BEARER, the 1-bit direction of
the transmission i.e. DIRECTION, and the message itself i.e. MESSAGE. The
DIRECTION bit shall be 0 for uplink and 1 for downlink. The bit length of the
MESSAGE is LENGTH.
Figure 12 illustrates the use of the integrity algorithm NIA to authenticate the
integrity of messages."
Based on these input parameters the sender computes a 32-bit message
authentication code (MAC-I/NAS-MAC) using the integrity algorithm NIA. The
message authentication code is then appended to the message when sent. For
integrity protection algorithms, the receiver computes the expected message
authentication code (XMAC-I/XNAS-MAC) on the message received in the same
way as the sender computed its message authentication code on the message sent
and verifies the data integrity of the message by comparing it to the received
message authentication code, i.e. MAC-I/NAS-MAC.
\*\*\*End
Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*

---

There currently exist certain challenges. There are different problems in LTE and NR, which fundamentally depends on whether the RRC Reestablishment-like message or re-establishment message (e.g. RRCReestablishment as in NR or RRCConnectionReestablishment as in LTE) is sent on SRB0 (i.e. unprotected and unencrypted), as in LTE, or on SRB1 (i.e. encrypted and integrity protected), as in NR.

upon receiving an integrity check failure indication from lower layers concerning SRB1 or SRB2. As the RRCReestablishment message is sent on SRB1, according to that condition the UE shall initiate reestablishment again upon receiving an integrity check failure indication from lower layer upon receiving an RRCReestablishment message, as shown below:

---

\*\*\*Start
Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*
5.3.7 RRC connection re-establishment
5.3.7.1    General
See Figures 13a and 13b. The purpose of this procedure is to re-establish the RRC
connection. A UE in RRC_CONNECTED, for which security has been activated, -continued may initiate the procedure in order to continue the RRC connection. The connection re-establishment succeeds if the network is able to find and verify a valid UE context or, if the UE context cannot be retrieved, and the network responds with an RRCSetup according to section 5.3.3.4. If AS security has not been activated, the UE does not initiate the procedure but instead moves to RRC_IDLE directly.
The network applies the procedure as follows:
- When AS security has been activated and the network retrieves or verifies the UE context:
  - to re-activate AS security without changing algorithms;
  - to re-establish and resume the SRB1;
- When UE is re-establishing an RRC connection, and the network is not able to retrieve or verify the UE context:
  - to discard the stored AS Context and release all RB;
  - fallback to establish a new RRC connection.

5.3.7.2    Initiation
The UE initiates the procedure when one of the following conditions is met:
  1> upon detecting radio link failure of the MCG, in accordance with 5.3.10; or
  1> upon re-configuration with sync failure of the MCG, in accordance with sub-clause 5.3.5.8.3; or
  1> upon mobility from NR failure, in accordance with sub-clause 5.4.3.5; or
  1> upon integrity check failure indication from lower layers concerning SRB1 or SRB2; or
  1> upon an RRC connection reconfiguration failure, in accordance with sub-clause 5.3.5.8.2.
. . .
\*\*\*End Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

However, according to sub-clause 5.3.7.5 in NR RRC (38.331), the UE shall perform the actions upon going to RRC_IDLE as specified in 5.3.11, with release cause 'other', as shown below:

\*\*\*Start Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

5.3.7.5    Reception of the RRCReestablishment by the UE
The UE shall:
  1> stop timer T301;
  1> consider the current cell to be the PCell;
  1> store the nextHopChainingCount value indicated in the RRCReestablishment message;
  1> update the $K_{gNB}$ key based on the current $K_{gNB}$ or the NH, using the stored nextHopChainingCount value, as specified in TS 33.501 [11];
  1> derive the $K_{RRCenc}$ key, the $K_{RRCint}$, the $K_{UPint}$ key and the $K_{UPenc}$ key associated with the previously configured ciphering algorithm, as specified in TS 33.501 [11];
  1> request lower layers to verify the integrity protection of the RRCReestablishment message, using the previously configured algorithm and the $K_{RRCint}$ key;
  1> if the integrity protection check of the RRCReestablishment message fails:
    2> perform the actions upon going to RRC_IDLE as specified in 5.3.11, with release cause 'other', upon which the procedure ends;
  1> configure lower layers to activate integrity protection using the previously configured algorithm and the KRRCint key immediately, i.e., integrity protection shall be applied to all subsequent messages received and sent by the UE, including the message used to indicate the successful completion of the procedure;
  1> configure lower layers to apply ciphering using the previously configured algorithm, the $K_{RRCenc}$ key and the $K_{UPenc}$ key immediately, i.e., ciphering shall be applied to all subsequent messages received and sent by the UE, including the message used to indicate the successful completion of the procedure;
  1> submit the RRCReestablishmentComplete message to lower layers for transmission;
  1> the procedure ends.
\*\*\*End Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* behavior so that appropriate network actions may not be taken uniformly across different UEs. In particular, if the UE performs re-establishment again after the indication from lower layers that the message like the RRCReestablishment fail the integrity protection check, the UE may always get stuck in the same cell as that is likely deemed to fail.

Such an ambiguity in the specifications may lead to different actions for different UEs, which may cause unpredictable Another problem in NR related to the second possible ambiguous action is that the Access Stratum indicates to upper layer a release cause 'other' which may lead to the UE doing nothing, while in fact a failure has occurred for a UE previously in RRC_CONNECTED.

In summary, the proposed solutions resolve the following problems:

Ambiguity problem in the actions the UE shall perform upon indications that integrity check fails e.g. upon the reception of RRCReestablishment of the first message after RRCReestablishment e.g. RRCReconfiguration like message;

Indication from lower layers do not lead to any action from the UE after failure is detected except some passive actions e.g. transition to RRC_IDLE and CM-IDLE.

Certain aspects of the present disclosure and their embodiments may provide solutions to these or other challenges. There are, proposed herein, various embodiments which address one or more of the issues disclosed herein.

SUMMARY

Figure 1:
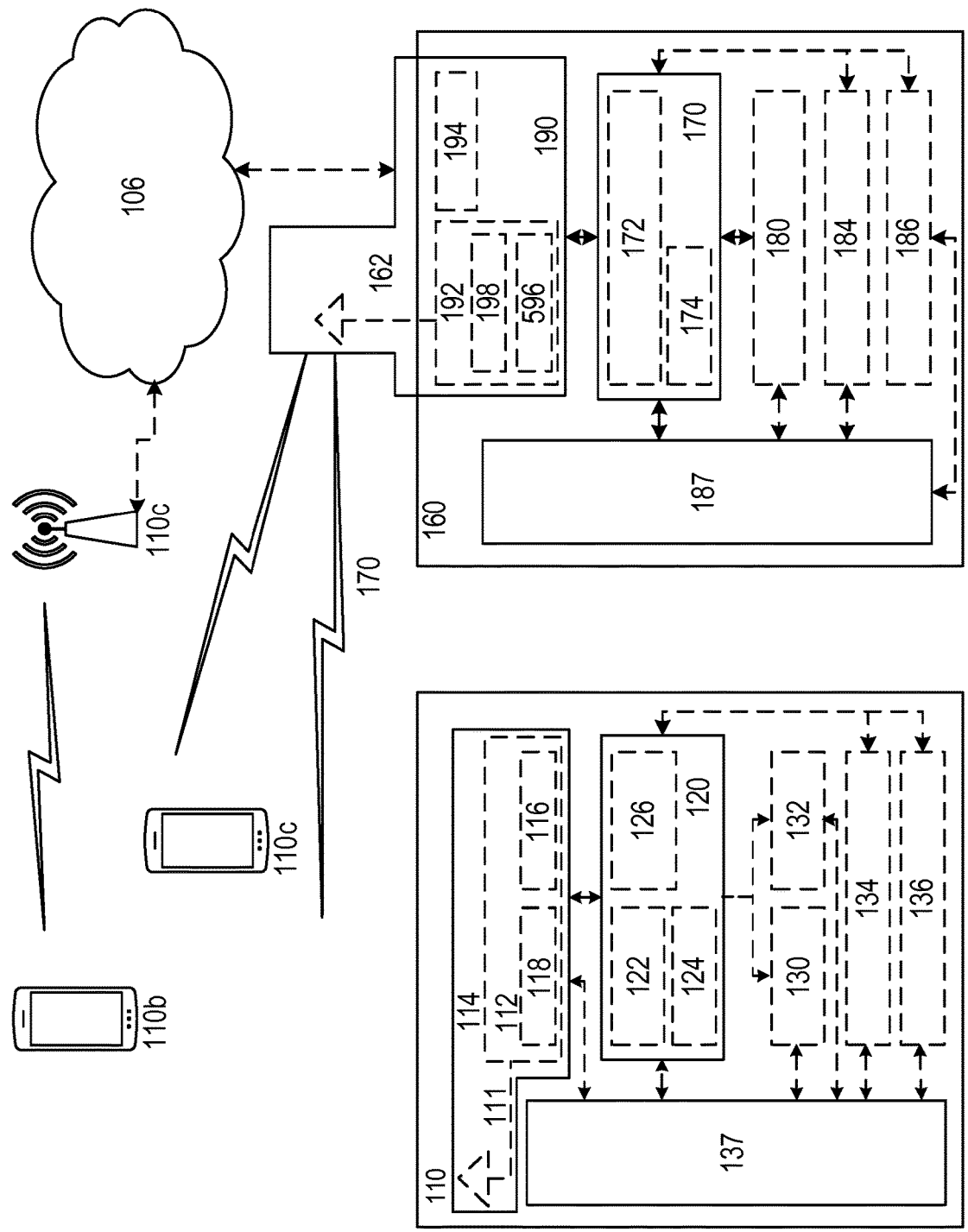
FIG. 1 illustrates a wireless network in accordance with some embodiments.

According to certain embodiments, method performed by a UE is disclosed for performing a reestablishment procedure, the method comprising:

receiving a re-establishment message;

upon reception of the re-establishment message, monitoring for an indication of an integrity check failure received from lower layers, wherein the indication relates to a first message or a second message received by the UE after transmitting a re-establishment request;

responsive to the indication of the integrity check failure, performing actions upon going into an RRC_IDLE mode of operation;

indicating a connection failure to upper layers; and based on the indication, upper layers triggering a recovery procedure.

The step of monitoring may comprise monitoring for an indication of possible integrity check failure indications from lower layers concerning SRB1 or SRB2 upon the reception of the reestablishment message. The reestablishment message may comprise an RRCReestablishment-like message. According to certain embodiments, the reestablishment message may be an RRCReestablishment message in NR, or an RRCConnectionReestablishment message in LTE, or any other message having the purpose of reestablishing the connection in response to a reestablishment request.

According to certain embodiments, the first message comprises a message for reestablishing a connection in response to the re-establishment request transmitted by the UE and/or a message that is integrity protected that is transmitted by the network after receiving the re-establishment request. For example, the first message may comprise a RRCReestablishment-like message that is sent on SRB1, such as an RRCReestablishment message in NR, or an RRCConnectionReestablishment message in LTE, or any message that is integrity protected that may be sent by the network after the RRCReestablishment Request like message e.g. RRC Release, etc.

According to certain embodiments, second message comprises a message that is integrity protected that is transmitted by the network after the transmitting a message re-establishing a connection in response to the re-establishment request transmitted by the UE. For example, the second message may comprise an RRCReconfiguration-like message, such as an RRCReconfiguration message in NR, or an RRCConnectionReconfiguration message in LTE, or any message that is integrity protected that may be sent by the network after the RRCReestablishment like message e.g. RRC Release, etc.

According to certain embodiments, the UE perform actions upon leaving RRC_CONNECTED or RRC_INACTIVE to go into RRC_IDLE e.g. in the case the failure is detected in LTE.

The lower layers may comprise the PDCP layer. The upper layers may comprise non-access stratum layers.

According to certain embodiments, the recovery procedure may be a NAS recovery procedure defined in NAS that is triggered upon the reception of a failure indication and/or the transition to RRC_IDLE with the appropriated release cause which may be a failure indication e.g. 'RRC Connection failure'. NAS recovery in this context may be interpreted as a registration area update (or equivalent, such as tracking area update).

According to certain embodiments, the recovery procedure may be a NAS recovery procedure defined in NAS that is triggered upon the reception of a failure indication and/or the transition to RRC_IDLE with the appropriate release cause which may be a more specific failure indication e.g. that RRC connection failed due to security or integrity failure and for which a specific recovery procedure can be attempted before potentially using a more generic and robust recovery procedure. A NAS recovery in this context may be interpreted as, e.g., initiating another SR procedure. A specific NAS recovery procedure may be more lightweight and/less signaling intensive than a more generic and robust NAS recovery procedure. (Only) if the specific recovery procedure fails a more generic and robust NAS recovery procedure is triggered. A more generic and robust NAS recovery in this context may be interpreted as a registration area update (or equivalent, such as tracking area update); According to certain embodiments, upon integrity verification failure the UE triggers the reestablishment procedure but it has different protection mechanisms, e.g., to avoid the action of a fake base station such as:

Define a counter such a way that the UE is only allowed to reestablish in the same cell X times;

Perform cell selection/re-selection to another RAT, another frequency and/or another cell after X times.

Perform NAS recovery and go to IDLE after X times.

According to certain embodiments, a user equipment (UE) is disclosed that is configured to perform a reestablishment procedure. The UE may comprise suitable hardware (e.g., processing circuitry) as disclosed herein, which enables the UE to perform any of the methods disclosed herein.

According to certain embodiments, a method performed by a network node is disclosed for performing a reestablishment procedure. The method comprises sending a reestablishment method to a UE. The method further comprises receiving an indication of an integrity check failure from the UE. In response, the network node monitors UE actions according to expected behavior.

According to certain embodiments, a network node is disclosed that is configured to perform a reestablishment procedure. The network node may comprise suitable hardware (e.g., processing circuitry) as disclosed herein, which enables the network node to perform any of the methods disclosed herein. The network node may be any suitable node for performing reestablishment messaging with a UE. Certain embodiments may provide one or more of the following technical advantages. First, by resolving the ambiguity there is going to be a predictable behavior for different UEs. Hence, upon failure, network may monitor UE actions according to the expected behavior defined in the RRC specifications. Then, thanks to the failure indication to upper layers the UE shall perform a recovery procedure, and, in case a malicious base station is trying to perform a denial of service (DoS) attack, the UE does not get stuck in the same cell and keeps trying to reestablish and/or connect there.

Another advantage is in the case the reestablishment message (e.g. RRC Reestablishment like message) is not integrity protected and the UE relies on the first RRC Reconfiguration to resume DRBs and SRBs. In that case, if integrity verification fails for that message after RRC Reestablishment, the UE performs a recovery procedure and goes to IDLE, instead of trying multiple subsequent RRC Reestablishment procedure, which would be deemed to fail. Particular embodiments may provide all, some, or none of these technical advantages. Additional technical advantages may be readily apparent to one of skill in the art in light of the present disclosure.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the draft Change Request provided in the Appendix.

According to a first embodiment, a possible implementation of the method is shown in the form of changes to the NR RRC specifications (38.331). It should be appreciated that these changes are for illustrative purposes. Other terms and/or standard sections may be used without departing from the scope of this disclosure or the functionality of the embodiments.

***Start
Excerpt*********************************************************************************
********
5.3.7.2    Initiation
The UE initiates the procedure when one of the following conditions is met:
    1> upon detecting radio link failure of the MCG, in accordance with 5.3.10; or
    1> upon re-configuration with sync failure of the MCG, in accordance with sub-
        clause 5.3.5.8.3; or
    1> upon mobility from NR failure, in accordance with sub-clause 5.4.3.5; or
    1> upon integrity check failure indication from lower layers concerning SRB1 or
        SRB2, except if the integrity check failure is detected on the
        RRCReestablishment message or the first RRCReconfiguration after
        RRCReestablishment message; or
    1> upon an RRC connection reconfiguration failure, in accordance with sub-
        clause 5.3.5.8.2.
The UE shall ensure having valid and up to date essential system information as
specified in section 5.2.2.2 before initiating this procedure.
Upon initiation of the procedure, the UE shall:
    1> stop timer T310, if running;
    1> stop timer T304, if running;
    1> start timer T311;
    1> suspend all RBs, except SRB0;
    1> reset MAC;
    1> release the MCG SCell(s), if configured, in accordance with sub-clause
        5.3.5.5.8;
    1> release the current dedicated ServingCell configuration; and
    1> apply the default L1 parameter values as specified values in corresponding
        physical layer specifications, except for the parameters for which values are
        provided in SIB1;
    1> release delayBudgetReportingConfig, if configured, and stop timer T3xx, if
        running;
    1> apply the default MAC Cell Group configuration as specified in 9.2.2x1;
    1> perform cell selection in accordance with the cell selection process as
        specified in TS 38.304 [21, 5.2.6].

*End Excerpt*******************************************************************

Next Changes:

*Start Excerpt*****************************************************************

5.3.7.5 Reception of the RRCReestablishment by the UE

The UE shall:
- 1> stop timer T301;
- 1> consider the current cell to be the PCell;
- 1> store the nextHopChainingCount value indicated in the RRCReestablishment message;
- 1> update the $K_{gNB}$ key based on the current $K_{gNB}$ or the NH, using the stored nextHopChainingCount value, as specified in TS 33.501 [11];
- 1> derive $K_{RRCenc}$ and $K_{UPenc}$ key associated with the previously configured cipheringAlgorithm, as specified in TS 33.501 [11];
- 1> derive the $K_{RRCint}$ and $K_{UPint}$ key associated with the previously configured integrityProtAlgorithm, as specified in TS 33.501 [11].
- 1> request lower layers to verify the integrity protection of the RRCReestablishment message, using the previously configured algorithm and the $K_{RRCint}$ key;
- 1> if the integrity protection check of the RRCReestablishment message fails; or
- 1> if the lower layers indicate an integrity protection check of the first RRCReconfiguration after RRCReestablishment message fails:
  - 2> perform the actions upon going to RRC_IDLE as specified in 5.3.11, with release cause 'RRC Connection Failure~~other~~', upon which the procedure ends;
- 1> configure lower layers to resume integrity protection for SRB1 using the previously configured algorithm and the KRRCint key immediately, i.e., integrity protection shall be applied to all subsequent messages received and sent by the UE, including the message used to indicate the successful completion of the procedure;
- 1> configure lower layers to resume ciphering for SRB1 using the previously configured algorithm, the $K_{RRCenc}$ key immediately, i.e., ciphering shall be applied to all subsequent messages received and sent by the UE, including the message used to indicate the successful completion of the procedure;
- 1> submit the RRCReestablishmentComplete message to lower layers for transmission;
- 1> the procedure ends.

*End Excerpt*******************************************************************

According to a second embodiment, a possible implementation of the method is shown in the form of changes to the NR RRC specifications (38.331). It should be appreciated that these changes are for illustrative purposes. Other terms and/or standard sections may be used without departing from the scope of this disclosure or the functionality of the embodiments.

*Start Excerpt*****************************************************************

5.3.7.2 Initiation

The UE initiates the procedure when one of the following conditions is met:
- 1> upon detecting radio link failure of the MCG, in accordance with 5.3.10; or
- 1> upon re-configuration with sync failure of the MCG, in accordance with sub-clause 5.3.5.8.3; or
- 1> upon mobility from NR failure, in accordance with sub-clause 5.4.3.5; or
- 1> upon integrity check failure indication from lower layers concerning SRB1 or SRB2, except if the integrity check failure is detected on the RRCReestablishment message or the first RRCReconfiguration after RRCReestablishment message; or
- 1> upon an RRC connection reconfiguration failure, in accordance with sub-clause 5.3.5.8.2.

The UE shall ensure having valid and up to date essential system information as specified in section 5.2.2.2 before initiating this procedure.

-continued

Upon initiation of the procedure, the UE shall:
  1> stop timer T310, if running;
  1> stop timer T304, if running;
  1> start timer T311;
  1> suspend all RBs, except SRB0;
  1> reset MAC;
  1> release the MCG SCell(s), if configured, in accordance with sub-clause 5.3.5.5.8;
  1> release the current dedicated ServingCell configuration; and
    2> apply the default L1 parameter values as specified values in corresponding physical layer specifications, except for the parameters for which values are provided in SIB1;
  1> release delayBudgetReportingConfig, if configured, and stop timer T3xx, if running;
  1> apply the default MAC Cell Group configuration as specified in 9.2.2x1;;
  1> perform cell selection in accordance with the cell selection process as specified in TS 38.304 [21, 5.2.6].
\*\*\*End Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

20

Next Changes

\*\*\*Start Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

5.3.7.5  Reception of the RRCReestablishment by the UE
The UE shall:
  1> consider the current cell to be the PCell;
  1> store the nextHopChainingCount value indicated in the RRCReestablishment message;
  1> update the $K_{gNB}$ key based on the current $K_{gNB}$ or the NH, using the stored nextHopChainingCount value, as specified in TS 33.501 [11];
  1> derive $K_{RRCenc}$ and $K_{UPenc}$ key associated with the previously configured cipheringAlgorithm, as specified in TS 33.501 [11];
  1> derive the $K_{RRCint}$ and $K_{UPint}$ key associated with the previously configured integrityProtAlgorithm, as specified in TS 33.501 [11].
  1> request lower layers to verify the integrity protection of the RRCReestablishment message, using the previously configured algorithm and the $K_{RRCint}$ key;
  1> if the integrity protection check of the RRCReestablishment message fails:
    2> perform the actions upon going to RRC_IDLE as specified in 5.3.11, with release cause 'RRC Connection Failureother', upon which the procedure ends;
  1> stop timer T301;
  1> configure lower layers to resume integrity protection for SRB1 using the previously configured algorithm and the KRRCint key immediately, i.e., integrity protection shall be applied to all subsequent messages received and sent by the UE, including the message used to indicate the successful completion of the procedure;
  1> configure lower layers to resume ciphering for SRB1 using the previously configured algorithm, the $K_{RRCenc}$ key immediately, i.e., ciphering shall be applied to all subsequent messages received and sent by the UE, including the message used to indicate the successful completion of the procedure;
  1> submit the RRCReestablishmentComplete message to lower layers for transmission;
  1> the procedure ends.
[...]
5.3.7.7  T301 expiry, integrity check failure from lower layers while T301 is running or selected cell no longer suitable
The UE shall:
  1> if timer T301 expires; or
  1> if the selected cell becomes no longer suitable according to the cell selection criteria as specified in TS 38.304 [21]:
  1> if lower layers indicate integrity check failure while T301 is running:
    2> perform the actions upon going to RRC_IDLE as specified in 5.3.11, with release cause 'RRC connection failure'.
\*\*\*End Excerpt\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Some of the embodiments described in this disclosure may be implemented in the LTE RRC specifications (3GPP TS 36.331) as well. Proposed changes are as follows. It should be appreciated that these changes are for illustrative purposes. Other terms and/or standard sections may be used without departing from the scope of this disclosure or the functionality of the embodiments.

FIG. 1 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 1. For simplic-

```
***Start
Excerpt**************************************************************************
*********
5.3.7.2     Initiation
The UE shall only initiate the procedure either when AS security has been activated
or for a NB-IoT UE supporting RRC connection re-establishment for the Control
Plane CIoT EPS optimisation. The UE initiates the procedure when one of the
following conditions is met:
    1> upon detecting radio link failure, in accordance with 5.3.11; or
    1> upon handover failure, in accordance with 5.3.5.6; or
    1> upon mobility from E-UTRA failure, in accordance with 5.4.3.5; or
    1> upon integrity check failure indication from lower layers concerning SRB1 or
       SRB2, except for the first message after the reception of
       RRCConnectionReestablishment message: or
    1> upon an RRC connection reconfiguration failure, in accordance with 5.3.5.5; or
    1> upon an RRC connection reconfiguration failure, in accordance with TS38.331
       [82, 5.3.5.5].
Upon initiation of the procedure, the UE shall:
    1> stop timer T310, if running;
    1> stop timer T312, if running;
    1> stop timer T313, if running;
    1> stop timer T307, if running;
    1> start timer T311;
    1> stop timer T370, if running;
    1> release uplinkDataCompression, if configured;
    1> suspend all RBs, including RBs configured with NR PDCP, except SRB0;
    1> reset MAC;
    1> release the MCG SCell(s), if configured, in accordance with 5.3.10.3a;
    1> apply the default physical channel configuration as specified in 9.2.4;
    1> except for NB-IoT, for the MCG, apply the default semi-persistent scheduling
       configuration as specified in 9.2.3;
    1> for the MCG, apply the default MAC main configuration as specified in 9.2.2;
    1> release powerPrefIndicationConfig, if configured and stop timer T340, if
       running;
    1> release reportProximityConfig, if configured and clear any associated
       proximity status reporting timer;
    1> release obtainLocationConfig, if configured;
    1> release idc-Config, if configured;
    1> release sps-AssistanceInfoReport, if configured;
    1> release measSubframePatternPCell, if configured;
    1> release the entire SCG configuration, if configured, except for the DRB
       configuration (as configured by drb-ToAddModListSCG);
    1> if EN-DC is configured:
       2> perform EN-DC release, as specified in TS 38.331 [82, 5.3.5.10];
    1> release naics-Info for the PCell, if configured;
    1> if connected as an RN and configured with an RN subframe configuration:
       2> release the RN subframe configuration;
    1> release the LWA configuration, if configured, as described in 5.6.14.3;
    1> release the LWIP configuration, if configured, as described in 5.6.17.3;
    1> release delayBudgetReportingConfig, if configured and stop timer T342, if
       running;
    1> perform cell selection in accordance with the cell selection process as
       specified in TS 36.304 [4];
    1> release bw-PreferenceIndicationTimer, if configured and stop timer T341, if
       running;
    1> release overheatingAssistanceConfig, if configured and stop timer T345, if
       running;
    1> release ailc-BitConfig, if configured;
[...]
5.3.7.x     Integrity check failure from lower layers for the first message received
after RRCConnectionReestablishment
The UE shall:
    1> Upon receiving an integrity check failure indication from lower layers for the
       first message received after RRCConnectionReestablishment:
       2> perform the actions upon going to RRC_IDLE as specified in 5.3.11 with
          release cause 'RRC connection failure'.
***End
Excerpt**********************************************************************
*****
``` ity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
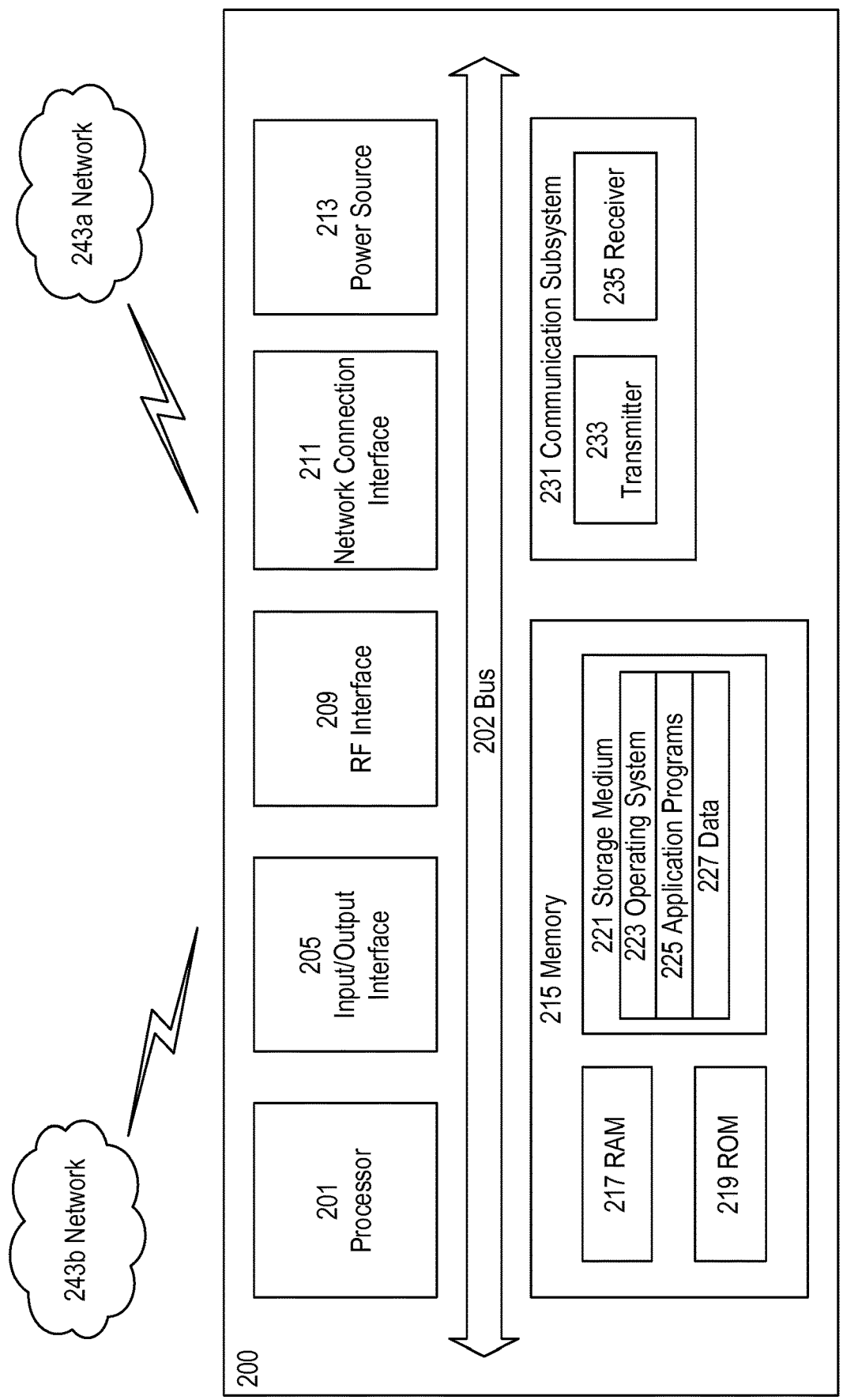
FIG. 2 illustrates a User Equipment in accordance with some embodiments.

FIG. 2 illustrates a User Equipment in accordance with some embodiments.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3$^{rd}$ Generation Partnership Project (3GPP), including a NB-IoT UE that is not intended for sale to, or operation by, a human user. UE 200, as illustrated in FIG. 2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
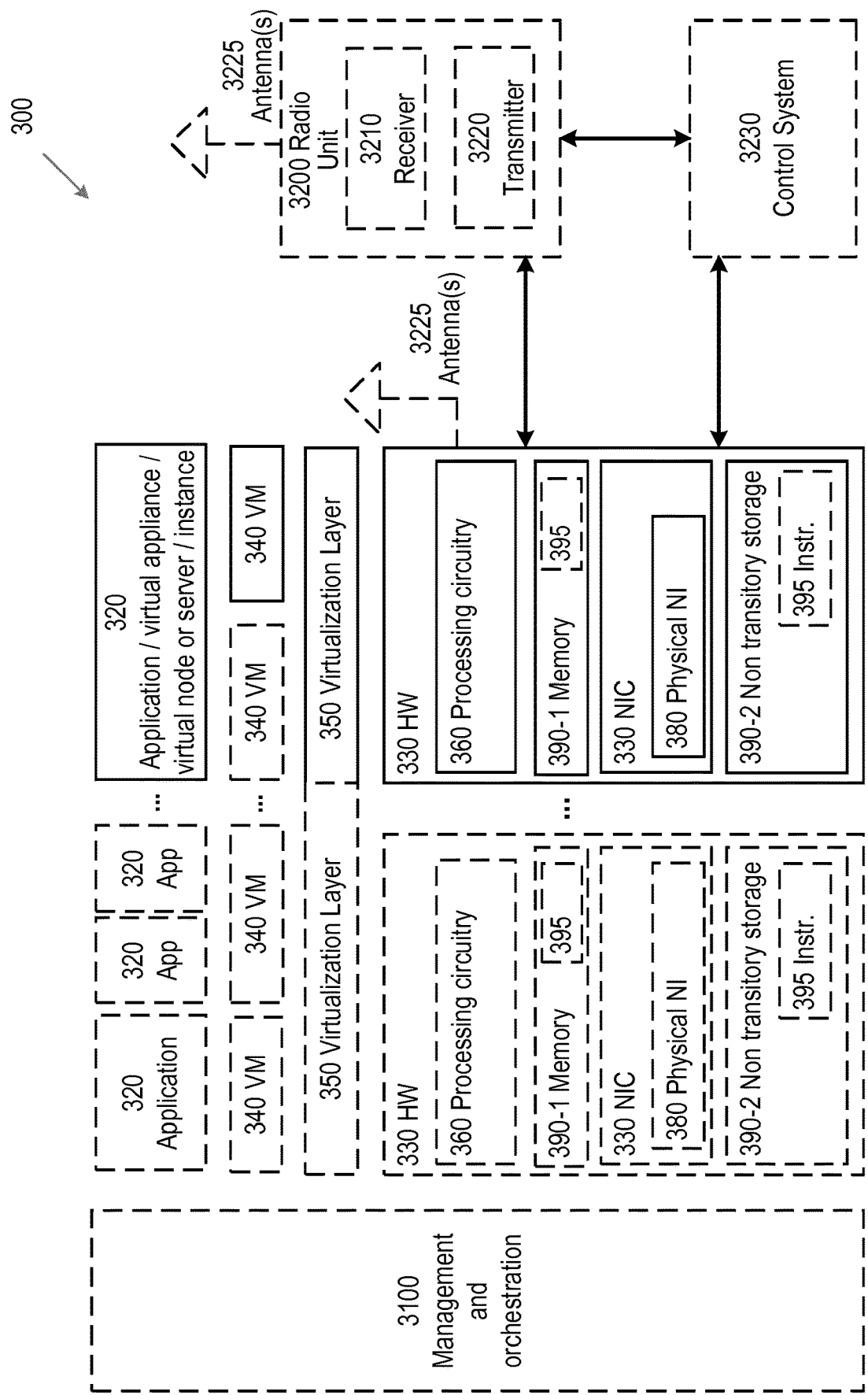
FIG. 3 illustrates a virtualization environment in accordance with some embodiments.

FIG. 3 illustrates a virtualization environment in accordance with some embodiments.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
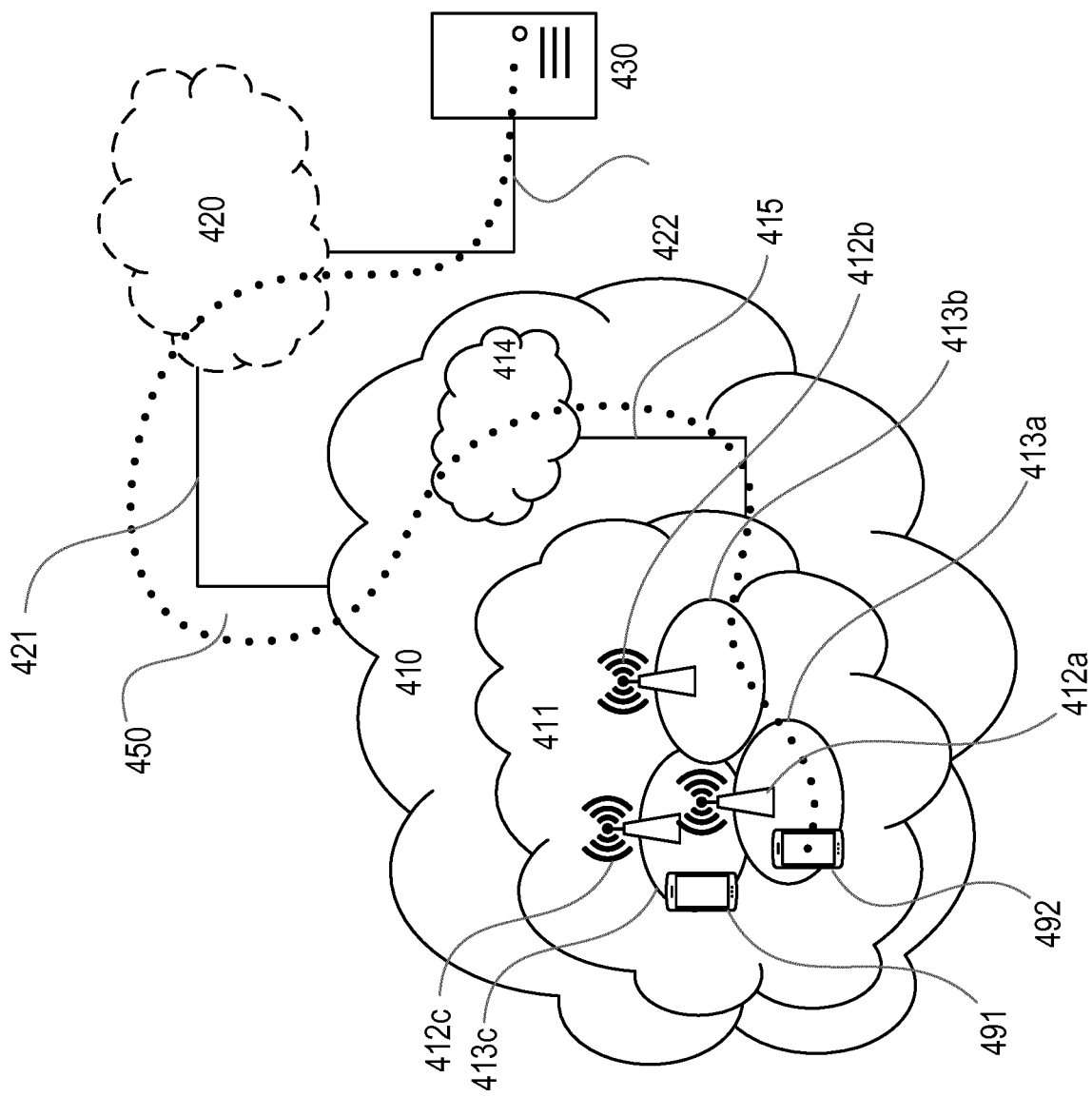
FIG. 4 illustrates a telecommunication network connected via an intermediate network to a host computer in accordance with some embodiments.

FIG. 4 illustrates a telecommunication network connected via an intermediate network to a host computer in accordance with some embodiments.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 5:
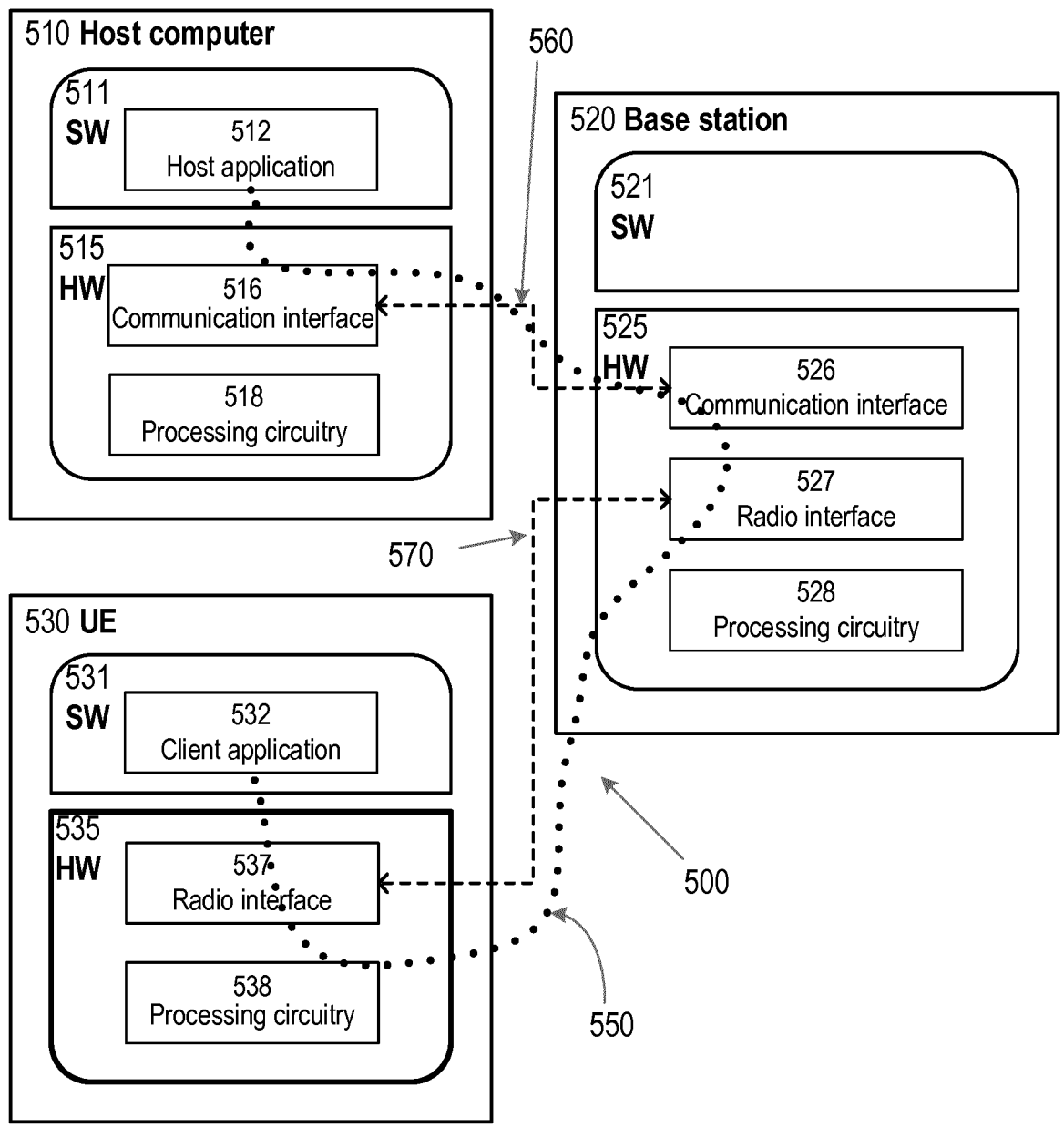
FIG. 5 illustrates a host computer communicating via a base station with a user equipment over a partially wireless connection in accordance with some embodiments.

FIG. 5 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and power consumption and thereby provide benefits such as reduced user waiting time, better responsiveness, and expended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
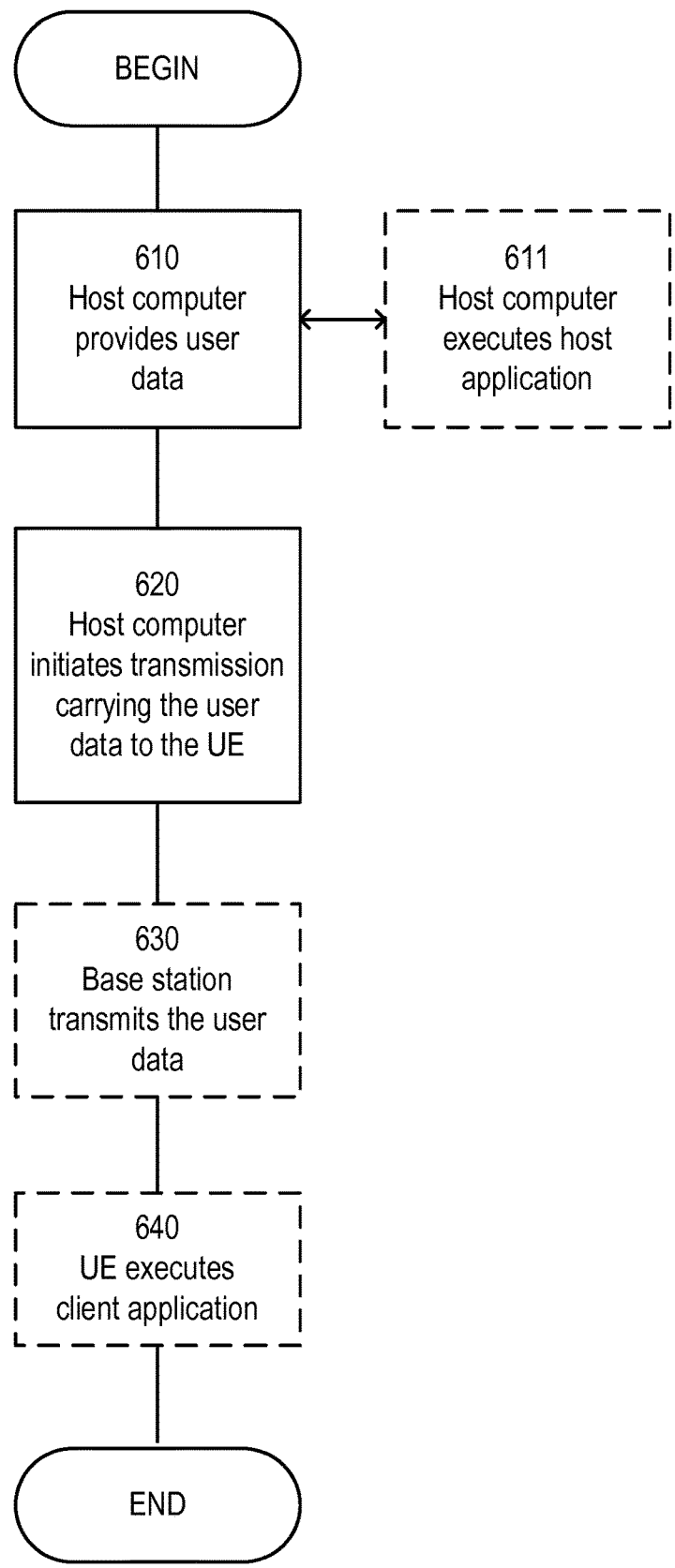
FIG. 6 illustrates methods implemented in a communication system including a host computer, a base station and a user equipment in accordance with some embodiments.

FIG. 6 illustrates methods implemented in a communication system including a host computer, a base station and a user equipment in accordance with some embodiments.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
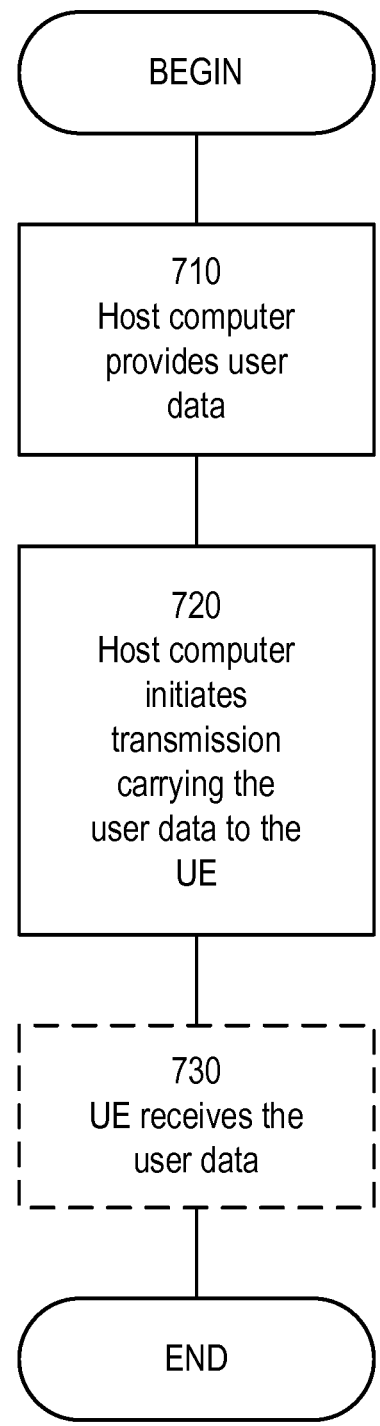
FIG. 7 illustrates methods implemented in a communication system including a host computer, a base station and a user equipment in accordance with some embodiments.

FIG. 7 illustrates methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
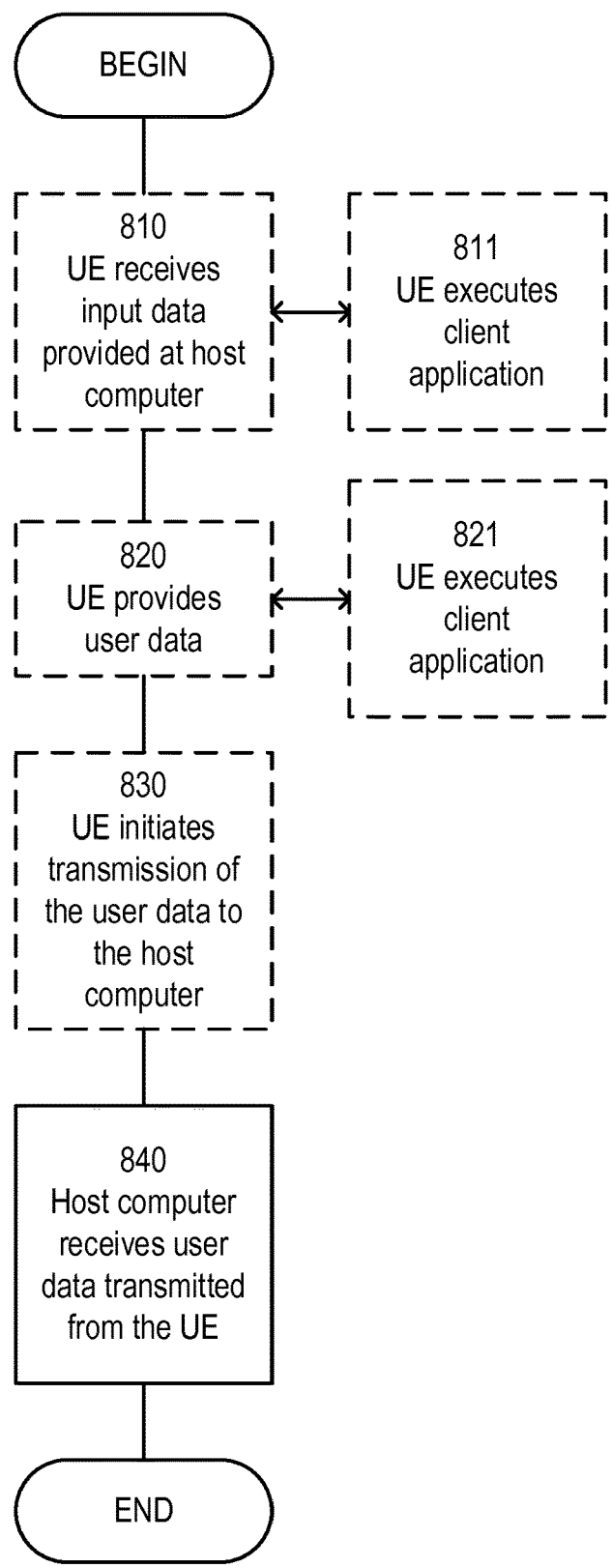
FIG. 8 illustrates methods implemented in a communication system including a host computer, a base station and a user equipment in accordance with some embodiments.

FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
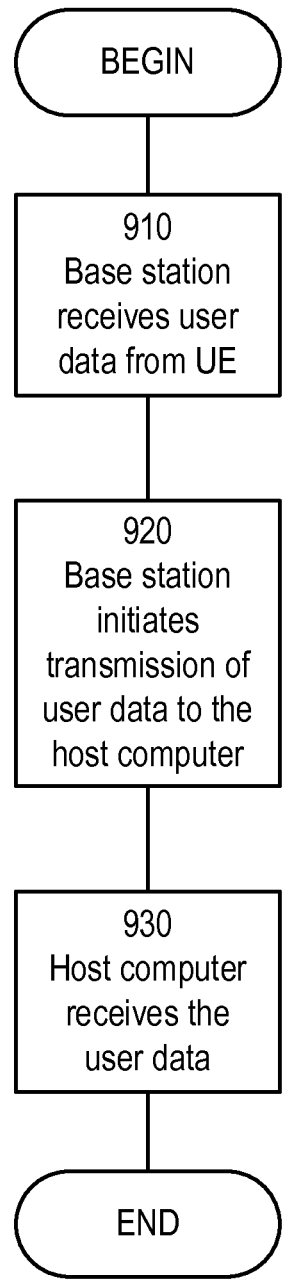
FIG. 9 illustrates methods implemented in a communication system including a host computer, a base station and a user equipment in accordance with some embodiments

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Embodiments

Group A Embodiments

1. A method performed by a wireless device for performing a reestablishment procedure, the method comprising:
   Receiving a reestablishment-like message;
   Detecting a possible integrity check failure;
   Indicating the integrity check failure to upper layers; and
   Triggering a recovery procedure.
2. The method of any of the previous embodiments, further comprising:
   providing user data; and
   forwarding the user data to a host computer via the transmission to the base station.

Group B Embodiments

3. A method performed by a base station for performing a reestablishment procedure, the method comprising:
   Sending a reestablishment-like message to a wireless device;
   Receiving an indication of an integrity check failure from the wireless device; and
   Monitoring UE actions according to expected behavior.
4. The method of any of the previous embodiments, further comprising:
   obtaining user data; and
   forwarding the user data to a host computer or a wireless device.

Group C Embodiments

5. A wireless device for performing a reestablishment procedure, the wireless device comprising:
   processing circuitry configured to perform any of the steps of any of the Group A embodiments; and
   power supply circuitry configured to supply power to the wireless device.
6. A base station for performing a reestablishment procedure, the base station comprising:
   processing circuitry configured to perform any of the steps of any of the Group B embodiments;
   power supply circuitry configured to supply power to the wireless device.
7. A user equipment (UE) for performing a reestablishment procedure, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

8. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

9. The communication system of the pervious embodiment further including the base station.

10. The communication system of the previous 2 embodiments, further including the UE, wherein the UE is configured to communicate with the base station.

11. The communication system of the previous 3 embodiments, wherein:

the processing circuitry of the host computer is configured to execute a host application, thereby providing the user data; and the UE comprises processing circuitry configured to execute a client application associated with the host application.

12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

13. The method of the previous embodiment, further comprising, at the base station, transmitting the user data.

14. The method of the previous 2 embodiments, wherein the user data is provided at the host computer by executing a host application, the method further comprising, at the UE, executing a client application associated with the host application.

15. A user equipment (UE) configured to communicate with a base station, the UE comprising a radio interface and processing circuitry configured to performs the of the previous 3 embodiments.

16. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

17. The communication system of the previous embodiment, wherein the cellular network further includes a base station configured to communicate with the UE.

18. The communication system of the previous 2 embodiments, wherein:

the processing circuitry of the host computer is configured to execute a host application, thereby providing the user data; and the UE's processing circuitry is configured to execute a client application associated with the host application.

19. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

20. The method of the previous embodiment, further comprising at the UE, receiving the user data from the base station.

21. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

22. The communication system of the previous embodiment, further including the UE.

23. The communication system of the previous 2 embodiments, further including the base station, wherein the base station comprises a radio interface configured to communicate with the UE and a communication interface configured to forward to the host computer the user data carried by a transmission from the UE to the base station.

24. The communication system of the previous 3 embodiments, wherein:

the processing circuitry of the host computer is configured to execute a host application; and the UE's processing circuitry is configured to execute a client application associated with the host application, thereby providing the user data.

25. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

26. A method implemented in a communication system including a host computer, a base station and a user equipment (UE), the method comprising:

at the host computer, receiving user data transmitted to the base station from the UE, wherein the UE performs any of the steps of any of the Group A embodiments.

27. The method of the previous embodiment, further comprising, at the UE, providing the user data to the base station.

28. The method of the previous 2 embodiments, further comprising:
    at the UE, executing a client application, thereby providing the user data to be transmitted; and
    at the host computer, executing a host application associated with the client application.
29. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
31. The communication system of the previous embodiment further including the base station.
32. The communication system of the previous 2 embodiments, further including the UE, wherein the UE is configured to communicate with the base station.
33. The communication system of the previous 3 embodiments, wherein:
    the processing circuitry of the host computer is configured to execute a host application;
    the UE is configured to execute a client application associated with the host application, thereby providing the user data to be received by the host computer.
34. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
35. The method of the previous embodiment, further comprising at the base station, receiving the user data from the UE.
36. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1×Radio Transmission Technology
3GPP 3rd Generation Partnership Project
5G 5th Generation
AS Access Stratum
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NAS Non Access Stratum
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a user equipment, UE, in communication with a network for performing a re-establishment procedure, the method comprising:
receiving a re-establishment message;
upon reception of the re-establishment message, monitoring for an indication of an integrity check failure received from lower layers, wherein the indication relates to a first message or a second message received by the UE after transmitting a re-establishment request;
responsive to the indication of the integrity check failure, performing actions upon going into an RRC_IDLE mode of operation;
indicating a connection failure to upper layers; and
responsive to the indication of the connection failure to the upper layers, triggering, by the upper layers, a recovery procedure.

2. The method of claim 1, wherein the re-establishment message comprises a message for re-establishing a connection in response to the re-establishment request transmitted by the UE.

3. The method of claim 1, wherein the first message comprises a message for re-establishing a connection in response to the re-establishment request transmitted by the UE and/or a message that is integrity protected that is transmitted by the network after receiving the re-establishment request transmitted by the UE.

4. The method of claim 1, wherein the second message comprises a message that is integrity protected that is transmitted by the network after transmitting a message re-establishing a connection in response to the re-establishment request transmitted by the UE.

5. The method of claim 1, wherein steps of receiving, monitoring, performing and indicating are performed by a first layer in a radio protocol architecture stack.

6. The method of claim 1, wherein the recovery procedure comprises a non-access stratum, NAS, recovery procedure.

7. The method of claim 6, wherein the recovery procedure comprises a registration area update.

8. The method of claim 1, wherein the recovery procedure comprises a procedure comprising a protection mechanism to avoid action of a fake base station.

9. The method of claim 1, wherein the connection failure to the upper layers is due to the integrity check failure.

10. A user equipment, UE, in communication with a network for performing a re-establishment procedure, the UE comprising processing circuitry configured to:
receive a re-establishment message;
upon reception of the re-establishment message, monitor for an indication of an integrity check failure received from lower layers, wherein the indication relates to a first message or a second message received by the UE after transmitting a re-establishment request;
responsive to the indication of the integrity check failure, perform actions upon going into an RRC_IDLE mode of operation;
indicate a connection failure to upper layers; and
responsive to the indication of the connection failure to the upper layers, triggering, by the upper layers, a recovery procedure.

11. The UE of claim 10, wherein the re-establishment message comprises a message for re-establishing a connection in response to the re-establishment request transmitted by the UE.

12. The UE of claim 10, wherein the first message comprises a message for re-establishing a connection in response to the re-establishment request transmitted by the UE and/or a message that is integrity protected that is transmitted by the network after receiving the re-establishment request transmitted by the UE.

13. The UE of claim 10, wherein the second message comprises a message that is integrity protected that is transmitted by the network after transmitting a message re-establishing a connection in response to the re-establishment request transmitted by the UE.

14. The UE of claim 10, wherein the processing circuitry is configured to perform steps of receiving, monitoring, performing and indicating in a first layer in a radio protocol architecture stack.

15. The UE of claim 10, wherein the recovery procedure comprises a non-access stratum, NAS, recovery procedure.

16. The UE of claim 15, wherein the recovery procedure comprises a registration area update.

17. The UE of claim 10, wherein the recovery procedure comprises a re-establishment procedure comprising a protection mechanism to avoid action of a fake base station.

18. The UE of claim 10, wherein the connection failure to the upper layers is due to the integrity check failure.

* * * * *

UNITED STATES PATENT AND TRADEMARK OFFICE
CERTIFICATE OF CORRECTION

PATENT NO. : 11,917,707 B2
APPLICATION NO. : 17/290880
DATED : February 27, 2024
INVENTOR(S) : Da Silva et al.

It is certified that error appears in the above-identified patent and that said Letters Patent is hereby corrected as shown below:

On the Title Page

On Page 2, item (56), under "OTHER PUBLICATIONS", in Column 1, Line 2, delete "archcitecture" and insert -- architecture --, therefor.

In the Drawings

In Fig. 2, Sheet 2 of 13, for Tag "201", Line 1, delete "Processor" and insert -- Processing Circuitry --, therefor.

Figure 10:
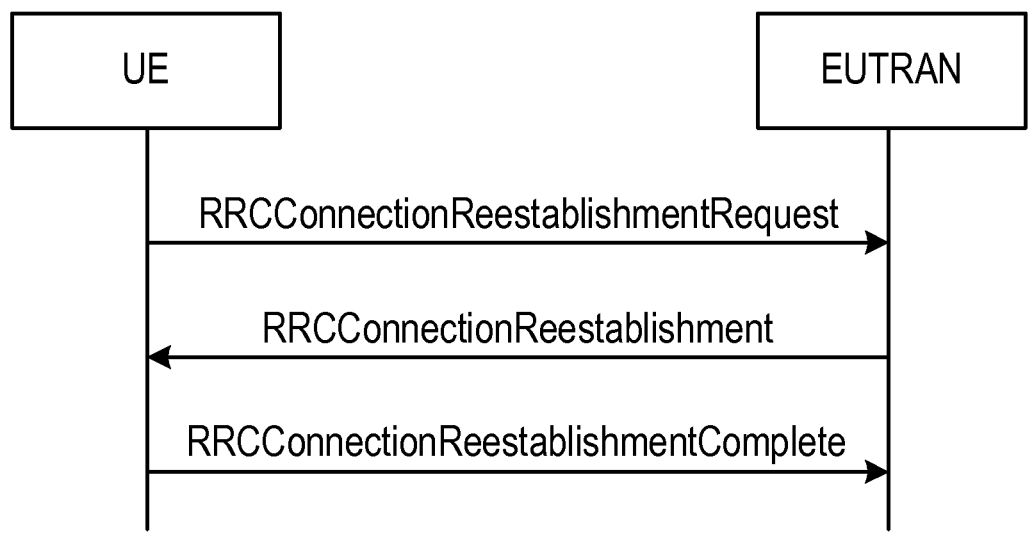
FIG. 10 illustrates a signaling diagram.
Figure 11:
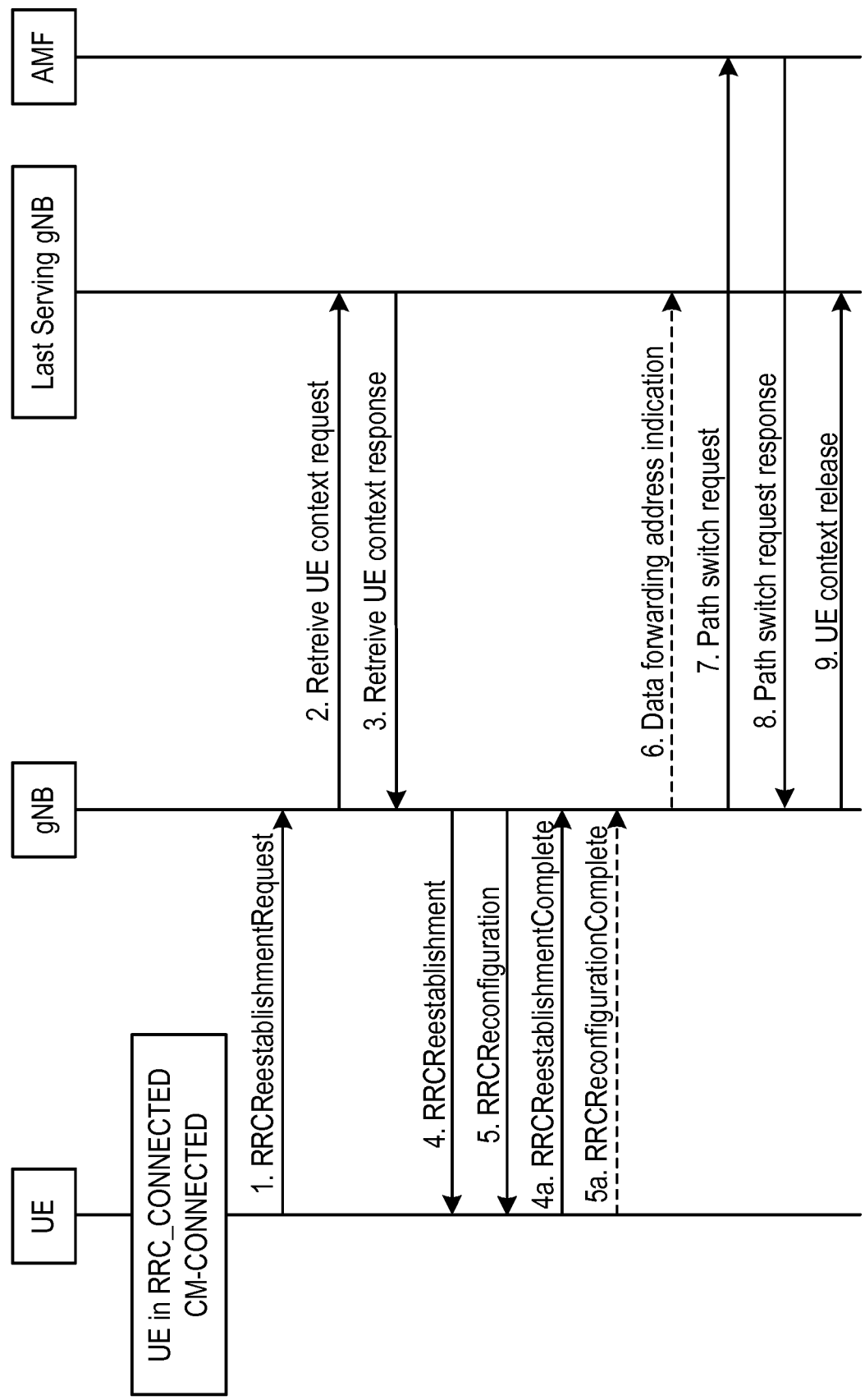
FIG. 11 illustrates a reestablishment procedure in NR where certain aspects were adopted.
Figure 12:
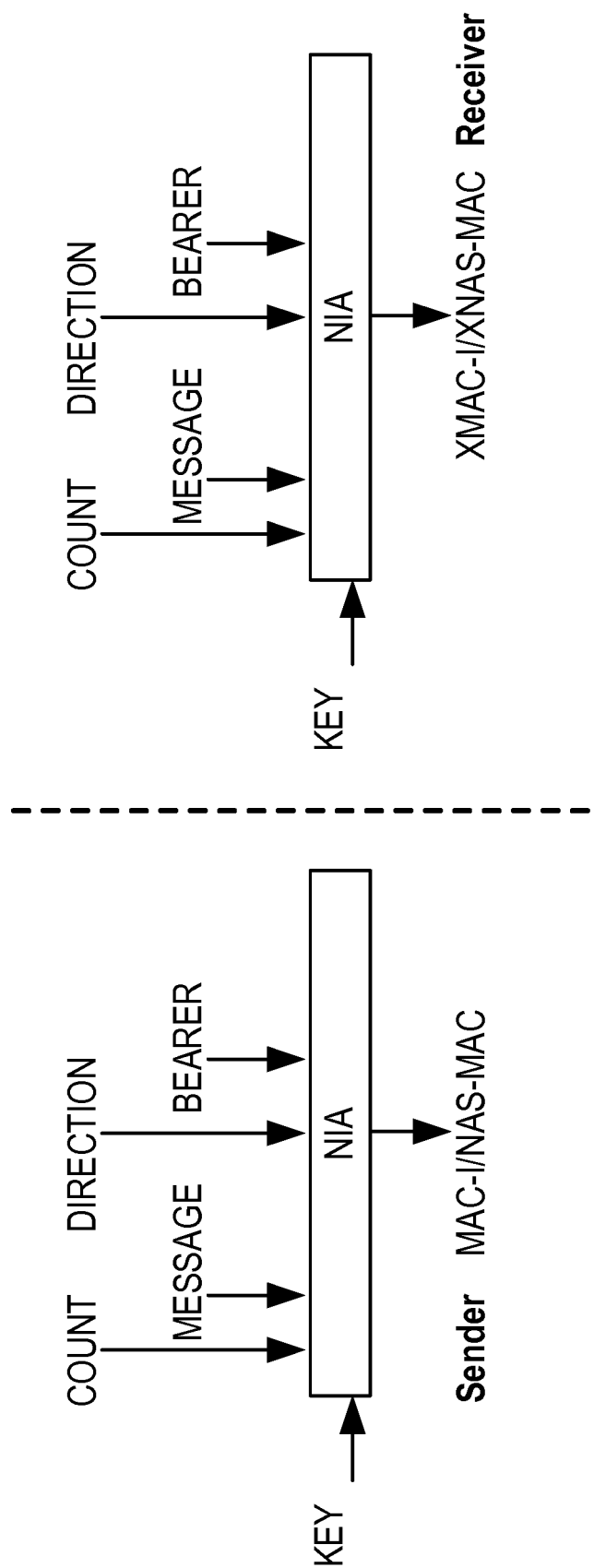
FIG. 12 illustrates the use of the integrity algorithm NIA to authenticate the integrity of messages.
Figure 13A:
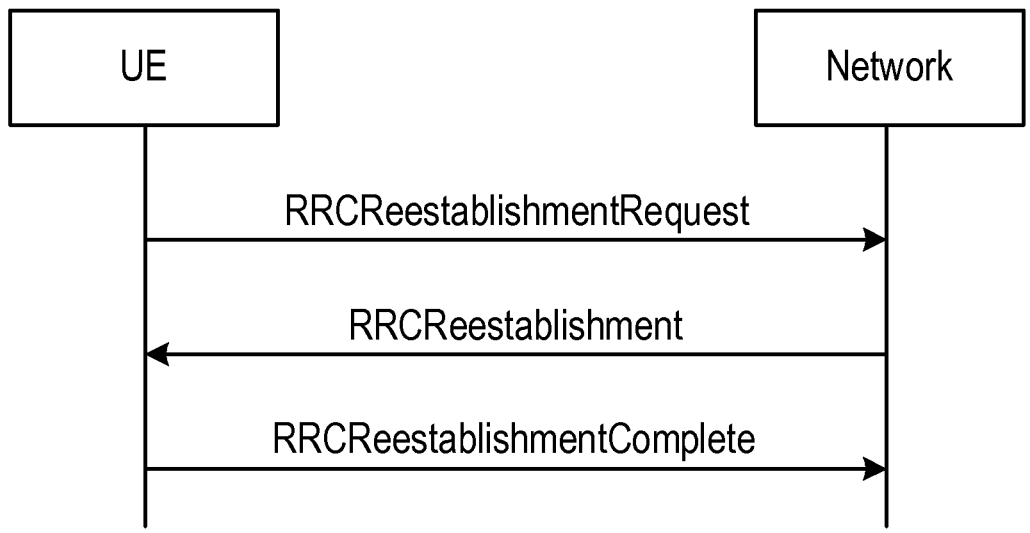
FIGS. 13a and 13b illustrate RRC connection re-establishment.
Figure 13B:
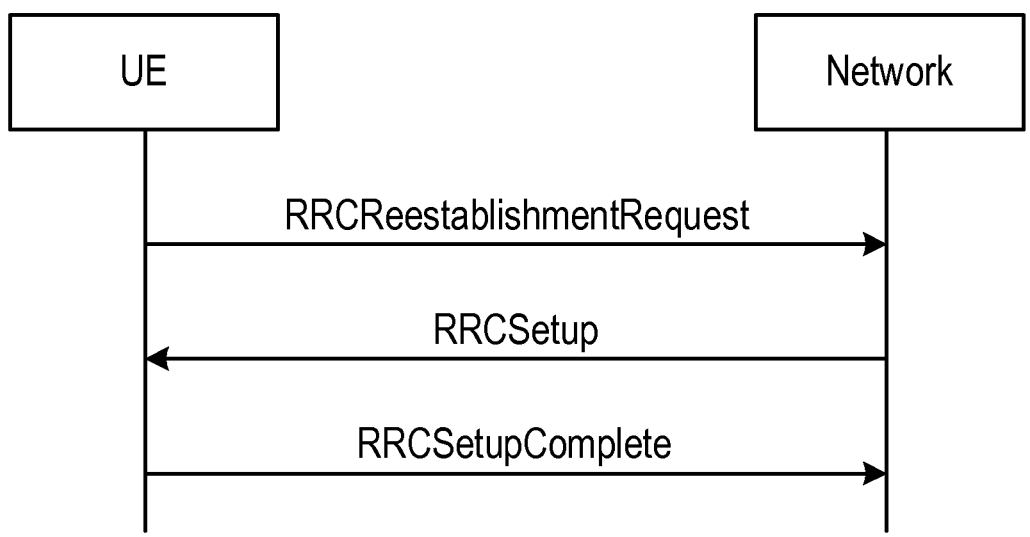

In Fig. 10, Sheet 10 of 13, delete "EUTRAN" and insert -- E-UTRAN --, therefor.

In the Specification

In Column 3, Line 24, delete "SGC," and insert -- 5GC, --, therefor.

In Column 8, Line 66, delete "and/less" and insert -- and/or less --, therefor.

In Column 9, Line 4, delete "update);" and insert -- update). --, therefor.

In Column 9, Line 9, delete "such" and insert -- in such --, therefor.

In Column 9, Line 10, delete "times," and insert -- times. --, therefor.

In Columns 11-12, in Table-Next Changes:, Line 15, delete "[11]." and insert -- [11]; --, therefor.

In Columns 11-12, in Table-Next Changes:, Line 20, delete "lavers" and insert -- layers --, therefor.

Signed and Sealed this
Seventeenth Day of September, 2024

Katherine Kelly Vidal
*Director of the United States Patent and Trademark Office*

CERTIFICATE OF CORRECTION (continued)
U.S. Pat. No. 11,917,707 B2

In Columns 13-14, in Table- continued, Line 15, delete "9.2.2X1;;" and insert -- 9.2.2X1; --, therefor.

In Columns 15-16, in Table, Line 14, delete "message:" and insert -- message; --, therefor.

In Column 19, Line 21, delete "(SOC)" and insert -- (SoC). --, therefor.

In Column 19, Line 31, delete "units" and insert -- units. --, therefor.

In Column 20, Line 44, delete "circuitry 190" and insert -- circuitry 192 --, therefor.

In Column 21, Line 59, delete "(CPE)." and insert -- (CPE), --, therefor.

In Column 22, Line 5, delete "narrow band internet of things" and insert -- Narrowband Internet of Things --, therefor.

In Column 22, Line 46, delete "circuitry 114" and insert -- circuitry 112 --, therefor.

In Column 23, Line 21, delete "SOC." and insert -- SoC. --, therefor.

In Column 25, Line 28, delete "interchangeable." and insert -- interchangeably. --, therefor.

In Column 25, Lines 36-3 7, delete "power source" and insert -- transmitter --, therefor.

In Column 27, Line 1, delete "high-density" and insert -- high-definition --, therefor.

In Column 27, Line 8, delete "(SIM/RUIM) module," and insert -- module (SIM/RUIM), --, therefor.

In Column 28, Lines 40-41, delete "memory 390. Memory 390" and insert -- memory 390-1. Memory 390-1 --, therefor.

In Column 3 1, Line 64, delete "which it" and insert -- which --, therefor.

In Column 32, Line 14, delete "expended" and insert -- expanded --, therefor.

In Column 32, Line 33, delete "etc.; the" and insert -- etc. The --, therefor.

In Column 33, Line 44, delete "embodiments" and insert -- embodiments. --, therefor.

In Column 34, Line 13, delete "according" and insert -- according to --, therefor.

In Column 35, Line 23, delete "pervious" and insert -- previous --, therefor.

In Column 35, Line 55, delete "performs the of" and insert -- perform --, therefor.

In Column 38, Line 1, delete "Carrier Component" and insert -- Component Carrier --, therefor.

CERTIFICATE OF CORRECTION (continued)
U.S. Pat. No. 11,917,707 B2

In Column 38, Line 3, delete "Code Division Multiplexing Access" and insert -- Code Division Multiple Access --, therefor.

In Column 38, Line 4, delete "Cell Global Identifier" and insert -- Cell Global Identity --, therefor.

In Column 38, Line 10, delete "information" and insert -- Indicator --, therefor.

In Column 38, Line 66, delete "Profile" and insert -- Power --, therefor.

In Column 39, Line 1, delete "Packet Gateway" and insert -- Packet Data Network Gateway --, therefor.

In Column 39, Line 4, delete "Precoder Matrix Indicator" and insert -- Precoding Matrix Indicator --, therefor.

In Column 39, Line 14, delete "Radio Link Management" and insert -- Radio Link Monitoring --, therefor.

In Column 39, Line 36, delete "Self Optimized Network" and insert -- Self-Organizing Network --, therefor.

In Column 39, Line 51, delete "Wide" and insert -- Wideband --, therefor.

In Column 39, Line 52, delete "Wide" and insert -- Wireless --, therefor.